US005584398A

United States Patent [19]

Lin

[11] Patent Number: 5,584,398
[45] Date of Patent: Dec. 17, 1996

[54] CD STORAGE RACK AND LAMP ASSEMBLY

[76] Inventor: Jack Lin, 4F, No. 116, Wen-Lin N. Rd., Taipei, Taiwan

[21] Appl. No.: 570,349

[22] Filed: Dec. 11, 1995

[51] Int. Cl.[6] ............................................. A47G 29/00
[52] U.S. Cl. ............................ 211/40; 211/188; 362/253; 362/413
[58] Field of Search ............................ 211/40, 188, 182; 362/125, 132, 253, 410, 413; 312/223.5

[56] References Cited

U.S. PATENT DOCUMENTS

| 3,765,541 | 10/1973 | Madey et al. | 211/188 X |
| 3,783,801 | 1/1974 | Engman | 211/188 X |
| 4,703,702 | 11/1987 | Speicher | 211/188 X |
| 4,939,625 | 7/1990 | Olson | 362/253 X |
| 4,940,150 | 7/1990 | Spengler | 211/188 |
| 5,365,417 | 11/1994 | Chen | 362/294 X |
| 5,370,242 | 12/1994 | Huang | 211/40 |

*Primary Examiner*—Korie Chan
*Attorney, Agent, or Firm*—Merchant, Gould, Smith, Edell, Welter & Schmidt, P.A.

[57] ABSTRACT

A CD storage rack and lamp assembly including a base, a base covering covered on the base, four sets of connecting rods respectively connected in series by connectors, a lamp stand connected to the base and the base covering by the connecting rods, a plurality of telescopic arms connected between the lamp holder and the lamp stand, and a plurality of CD carrier plates fastened to the connecting rods at different elevations between the lamp stand and the base covering.

1 Claim, 8 Drawing Sheets

5,584,398

1

CD STORAGE RACK AND LAMP ASSEMBLY

BACKGROUND OF THE INVENTION

The present invention relates to a CD storage rack and lamp assembly which comprises a CD storage rack and a desk lamp fixedly secured to the CD storage rack at the top.

A variety of CD storage racks have been disclosed for keeping individual compact disks, and have appeared on the market. When a CD storage rack is used, sufficient illumination is necessary. Furthermore, regular desk lamps are commonly comprised of a lamp stand, a lamp holder, and a support connected between the lamp stand and the lamp holder. These desk lamps are specifically designed to provide illumination only. There is known a desk lamp having a plurality of slots on the support thereof for keeping individual compact disks. However, the formation of the slots on the support obstructs the sense of beauty of the desk lamp.

SUMMARY OF THE INVENTION

The present invention has been accomplished to provide a CD storage rack and lamp assembly which combines a CD storage rack and a desk lamp into one unit. According to one aspect of the present invention, the CD storage rack and lamp assembly comprises a base, a base covering covered on the base, four sets of connecting rods respectively connected in series by connectors, a lamp stand connected to the base and the base covering by the connecting rods, a plurality of telescopic arms connected between the lamp holder and the lamp stand, and a plurality of CD carrier plates fastened to the connecting rods at different elevations between the lamp stand and the base covering. According to another aspect of the present invention, each CD carrier plate has a plurality of elongated CD loading slots for holding individual compact disks, each loading slot comprising a spring member at one end and a stop plate at an opposite end for holding an individual compact disk in place. According to still another aspect of the present invention, each connector is comprised of a first half-round tube and a second half-round tube connected into a tubular structure by fitting respective pins into respective pin holes to hold two connecting rods together. According to still another aspect of the present invention, the base defines a receiving chamber, which holds the electric circuit of the lamp.

2

Figure 1:
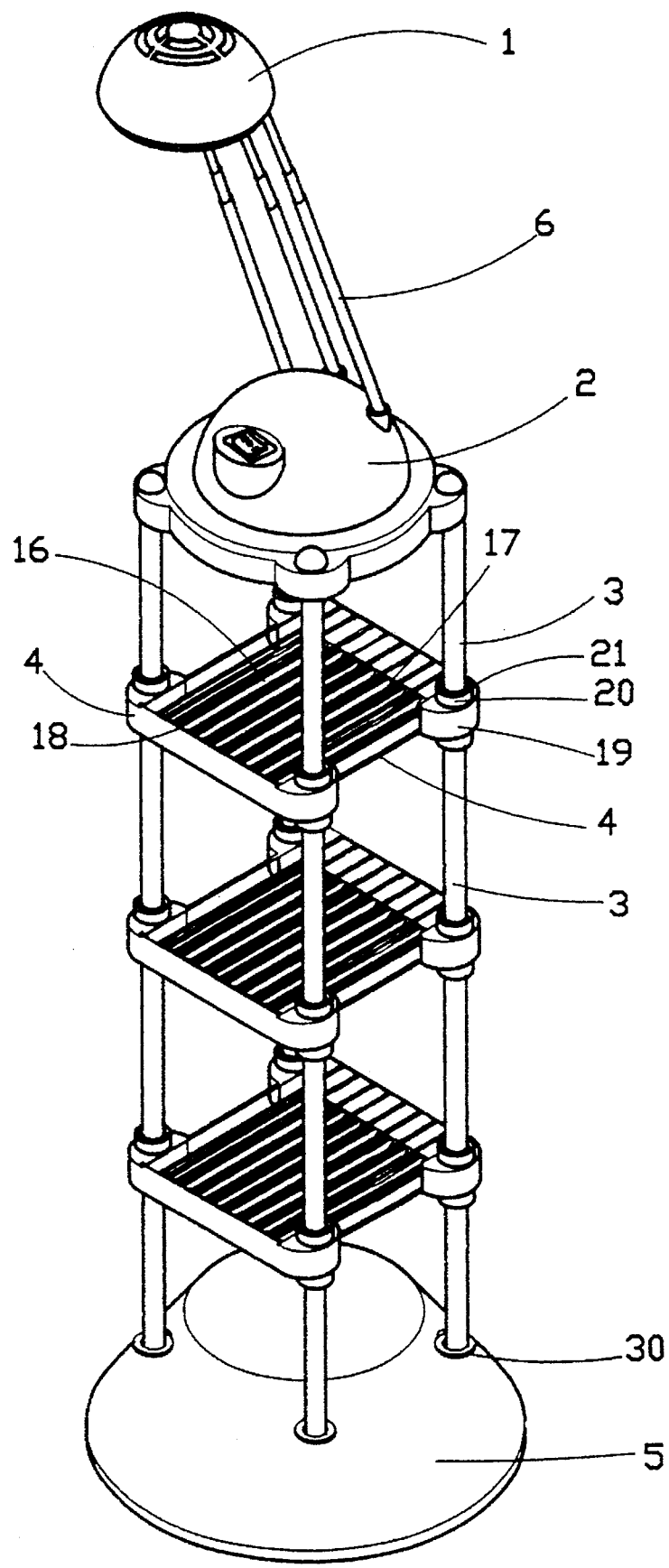
FIG. 1 is an elevational view of a CD storage rack and lamp assembly according to the present invention.
Figure 4:
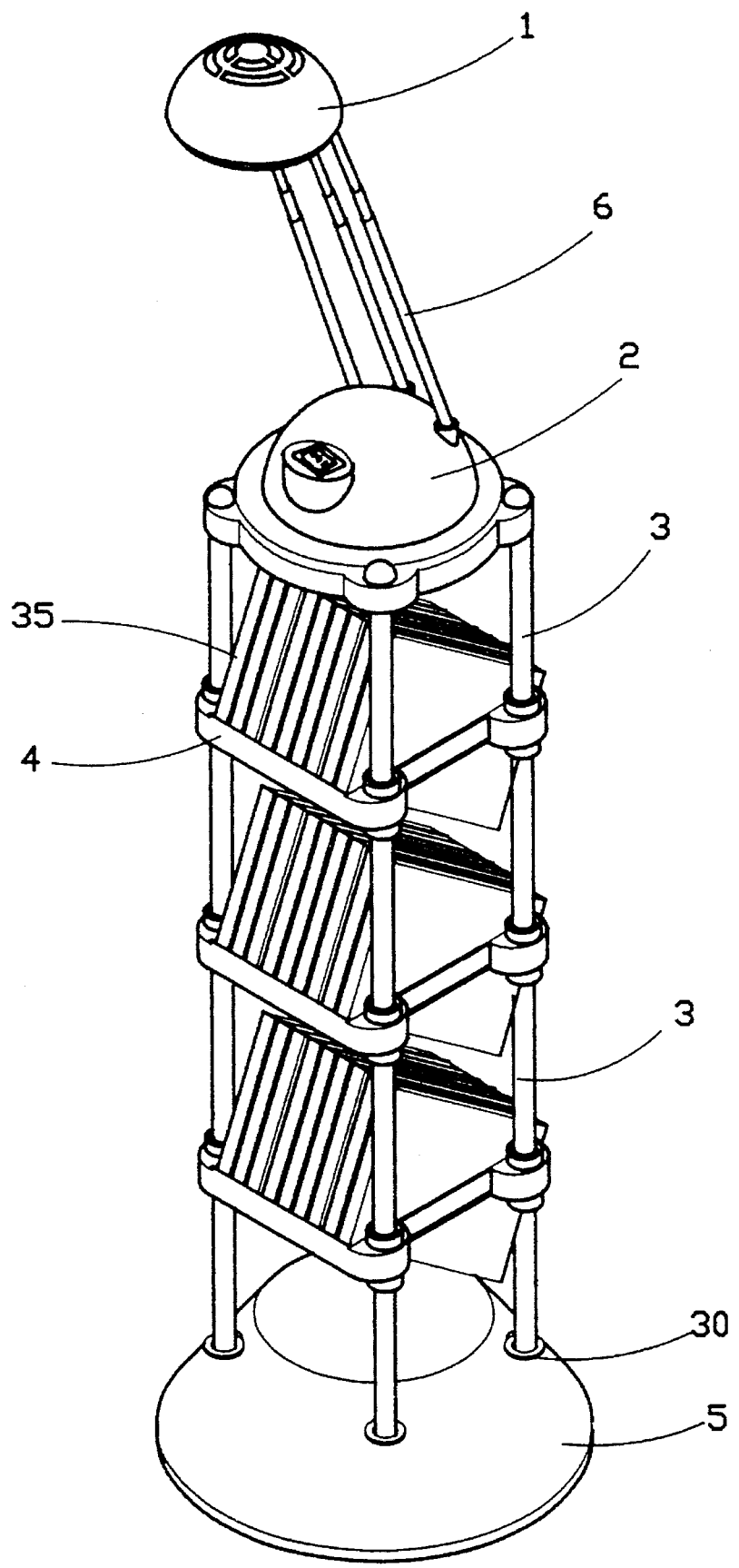
Figure 5:
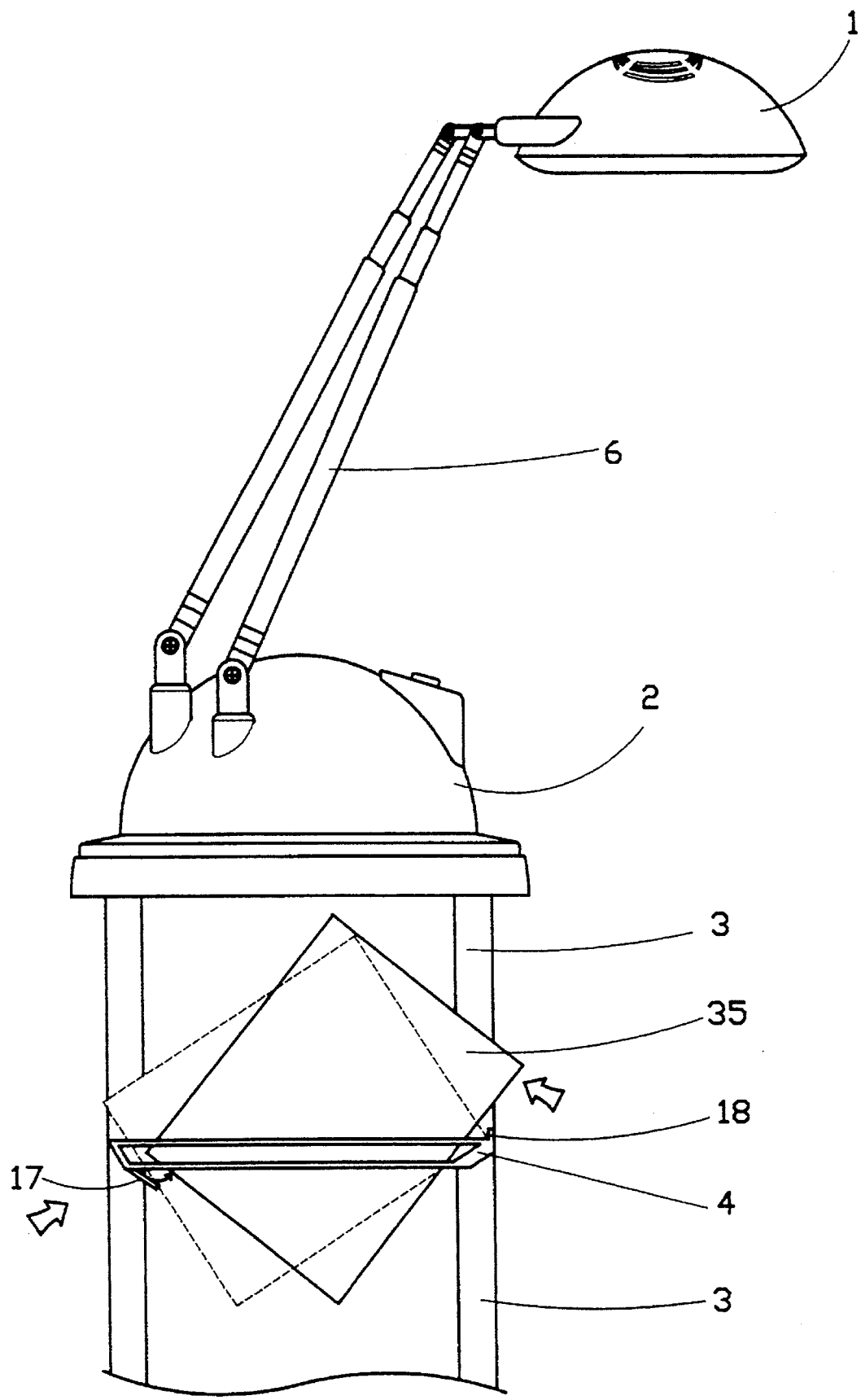

FIG. 4 is similar to FIG. 1 but showing a plurality of compact disks mounted in the CD carrier plates; and FIG. 5 shows the loading of one compact disk in one CD carrier plate according to the present invention.

DETAILED DESCRIPTION OF THE PREFERRED EMBODIMENT

Referring to FIG. 1, a CD storage rack and lamp assembly in accordance with the present invention is generally comprised of a lamp holder 1, a lamp stand 2, a plurality of telescopic arms 6 connected between the lamp holder 1 and the lamp stand 2, a base 27, a base covering 5, four sets of connecting rods 3 respectively connected in series by connectors 20 and connected between the lamp stand 2 and the 27, and a plurality of CD carrier plates 4 fastened to the connecting rods 3 at different elevations between the lamp stand 2 and the base covering 5.

Referring to FIGS. 2, 2C, 2F, and 3A, the lamp stand 2 has four nut holders 13 in four corners, four through holes 8 respectively disposed through the center of the nut holders 13. A nut 9 is mounted within each nut holder 13. A screw 7 is threaded into the nut 9 in each nut holder 13 and the inner thread 12 of the top coupling end 11 of one connecting rod 3. An ornamental cap 10 is fastened to each nut holder 13 and covered over the respective screw 7 and the respective nut 9.

Referring to FIGS. 2, 2D, 3, and 3B, each of the CD carrier plates 4 has four mounting blocks 19 in four corners corresponding to the through holes 8 of the lamp stand 2, each mounting block 19 defining a respective mounting hole 21 for mounting one connector 20, which holds two connecting rods 3 together. Each connecting rod 3 has two outward annular flanges 15 raised around the periphery near two opposite ends. Each connector 20 is comprised of two half-round tubes 14 connected together by fitting respective pins 23 into respective pin holes 24, and then fitted into the mounting hole 21 of one mounting block 19. Each half-round tube 14 has two inside mounting grooves 25 on the inside near two opposite ends for engagement with the outward flanges 15 of the respective connecting rods 3, and an outward flange 22 stopped outside the respective mounting block 19.

Figure 2:
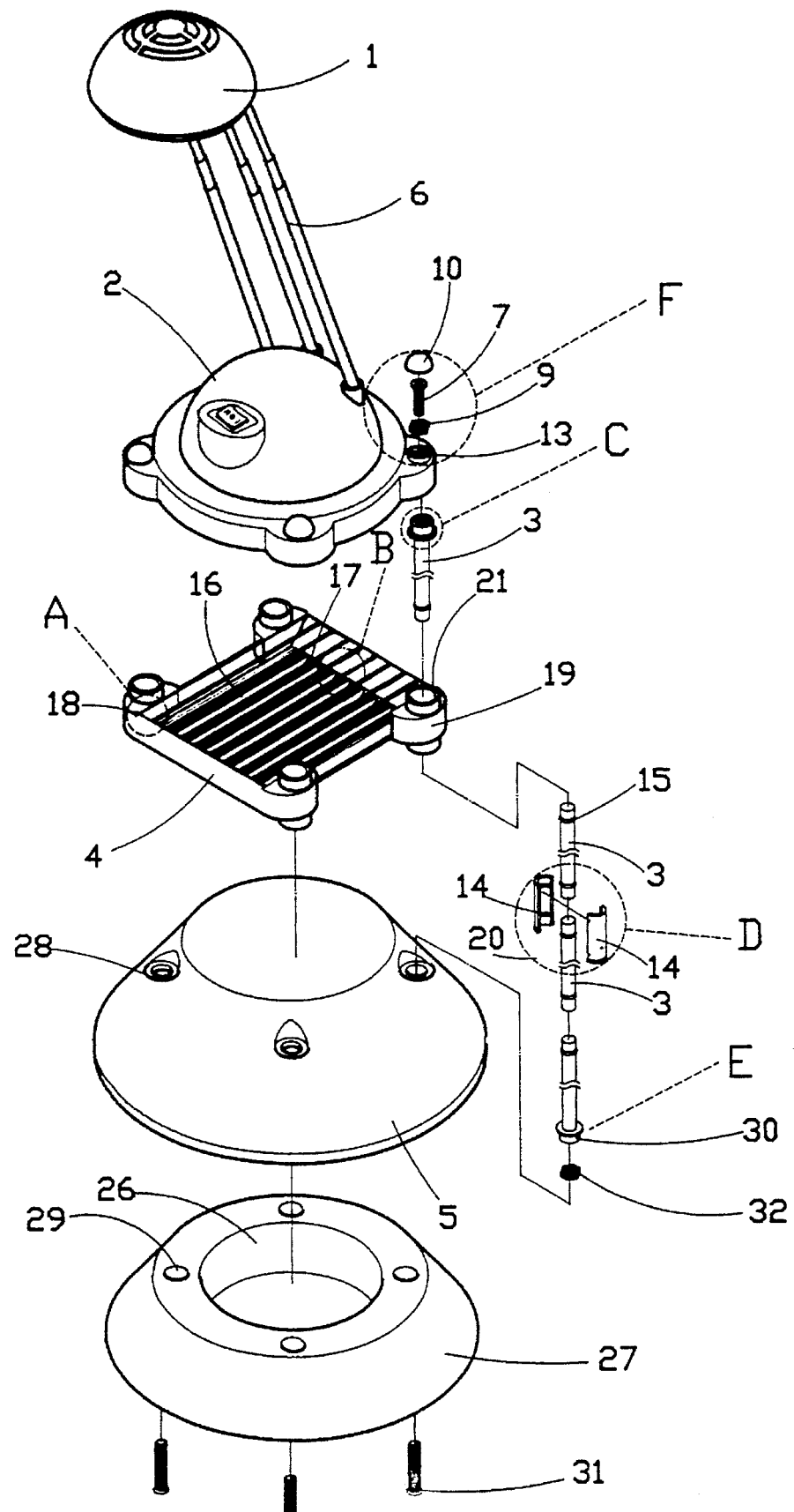
FIG. 2 is an exploded view of the CD storage rack and lamp assembly shown in FIG. 1.
Figure 2A:
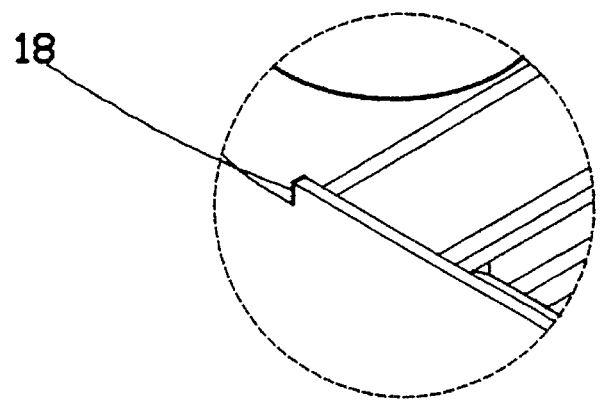
FIG. 2A is an enlarged view taken on part A of FIG. 2.
Figure 2B:
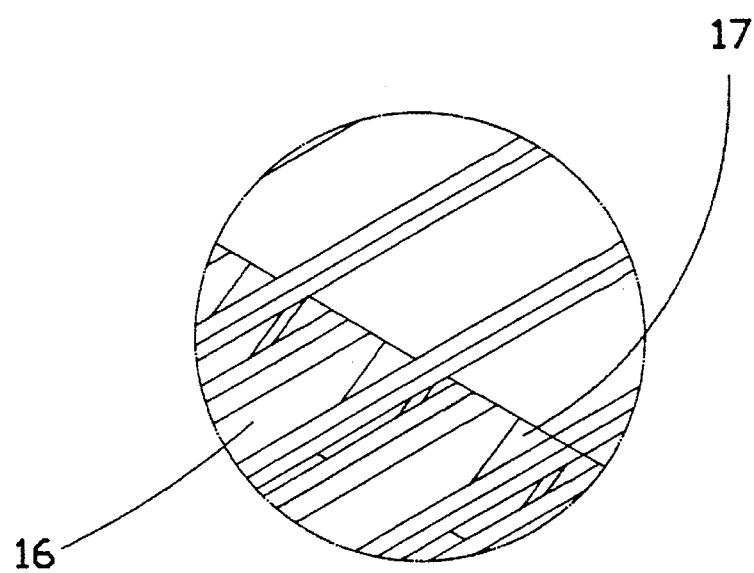
FIG. 2B is an enlarged view taken on part B of FIG. 2.
Figure 2C:
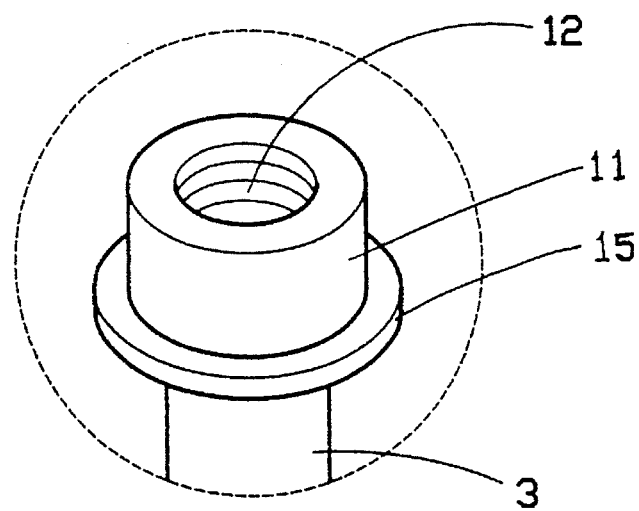
FIG. 2C is an enlarged view taken on part C of FIG. 2.
Figure 2D:
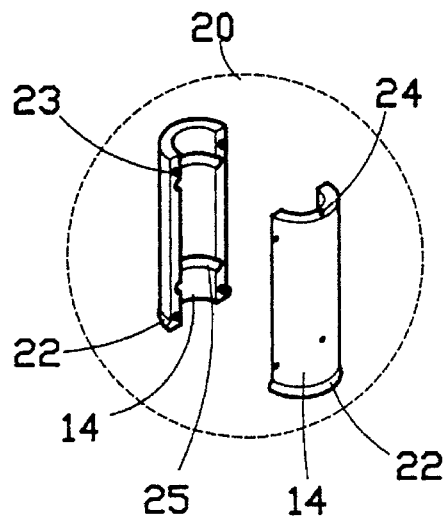
FIG. 2D is an enlarged view taken on part D of FIG. 2.
Figure 2E:
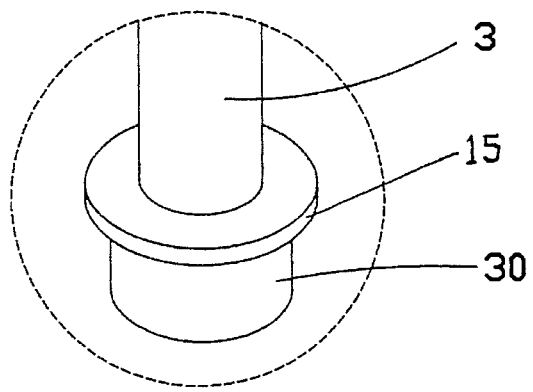
FIG. 2E is an enlarged view taken on part E of FIG. 2.
Figure 2F:
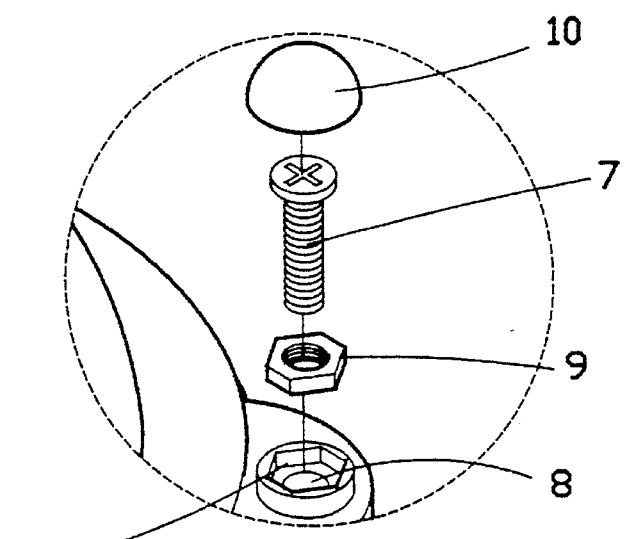
FIG. 2F is an enlarged view taken on part F of FIG. 2.
Figure 3:
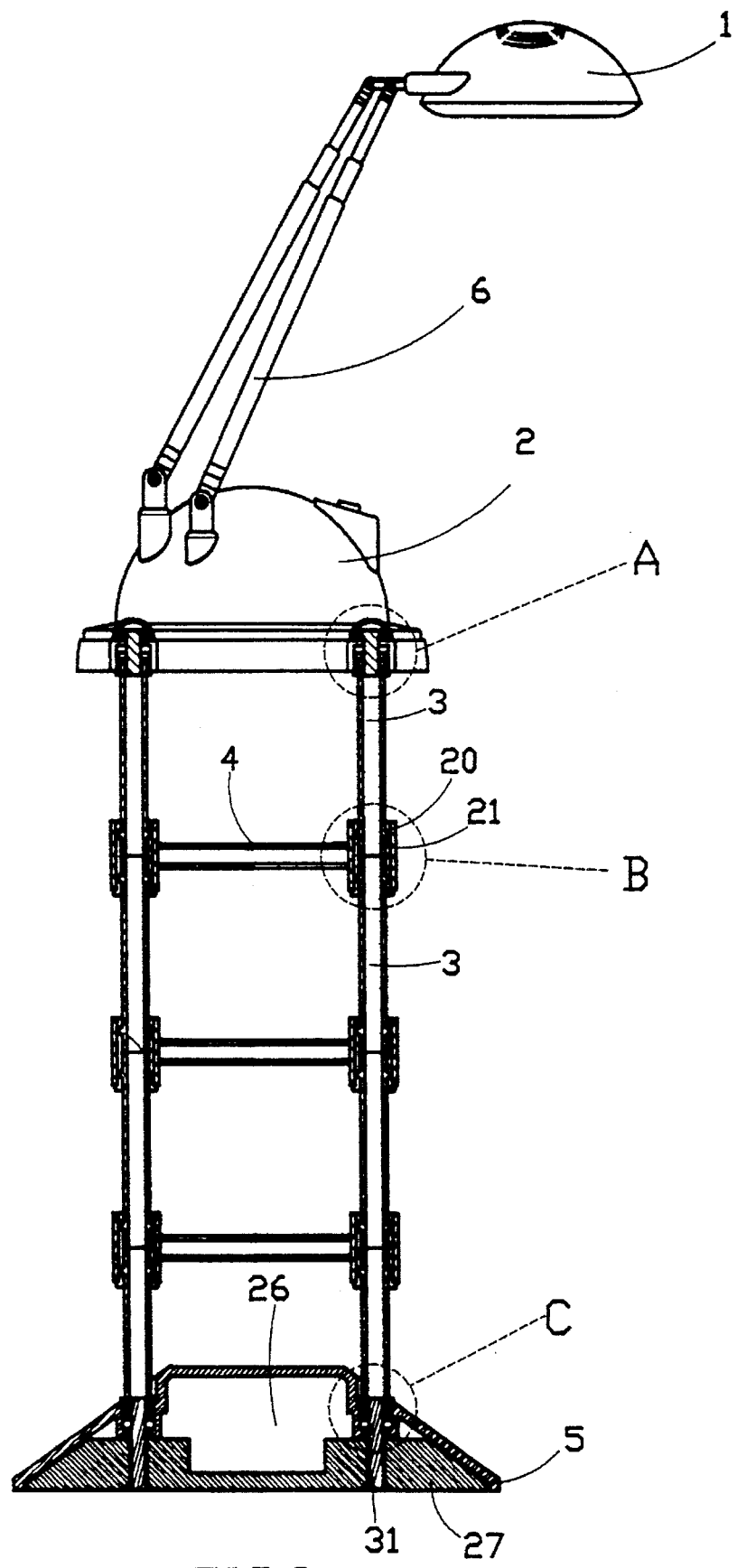
FIG. 3 is a side plain view of the CD storage rack and lamp assembly shown in FIG. 2.
Figure 3A:
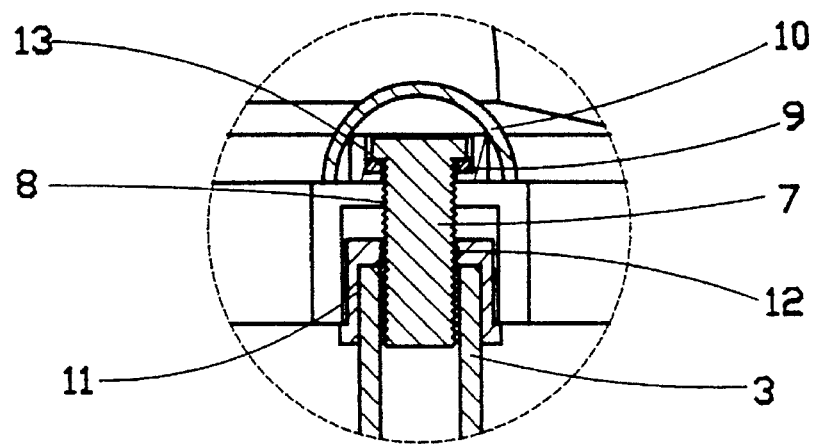
FIG. 3A is an enlarged view taken on part A of FIG. 3.
Figure 3B:
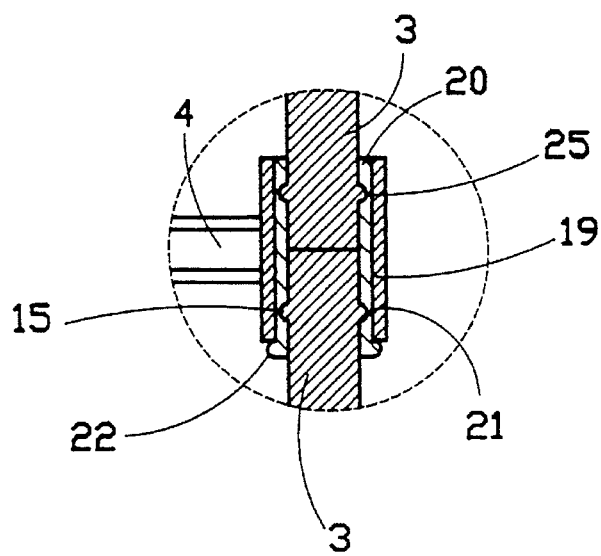
FIG. 3B is an enlarged view taken on part B of FIG. 3.
Figure 3C:
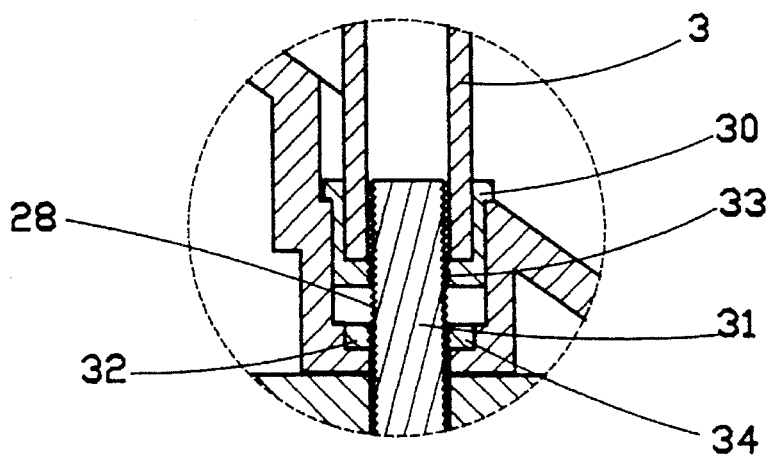
FIG. 3C is an enlarged view taken on part C of FIG. 3.

Referring to FIGS. 2, 2E, and 3C, the base 27 comprises a receiving chamber 26 at the center, which holds the electric circuit of the lamp holder 1, and a plurality of mounting holes 29 equiangularly spaced around the receiving chamber 26. The base covering 5 is covered on the base 27, having a plurality of mounting holes 28 corresponding to the mounting holes 29 of the base 27. By inserting respective screws 31 into the mounting holes 29 of the base 27 and the mounting holes 28 of the base covering 5 and then threading them into the inner threads 33 at the bottom coupling ends 30 of the respective connecting rods 3, the base 27 and the base covering 5 are fixed to the connecting rods 3.

Referring to FIGS. 2A, 2B, 4, and 5, each of the CD carrier plates 4 comprises a plurality of elongated CD loading slots 16 for holding individual compact disks. Each of the CD loading slots 16 comprises a spring member 17 at one end, and a stop plate 18 at an opposite end. When an individual compact disk 35 is inserted into one CD loading slot 16, the individual compact disk 35 is forced by the respective spring member 17 against the respective stop plate 18, and therefore the individual compact disk 35 is retained in place. When the individual compact disk 35 is depressed and forced away from the respective stop plate 18, the respective spring member 17 immediately forces the individual compact disk 35 upwards, and therefore the individual compact disk 35 is disengaged from the respective stop plate 18 and can be taken out of the respective CD loading slot 16.

While only one embodiment of the present invention has been shown and described, it will be understood that the drawings are designed for purposes of illustration only, and are not intended as a definition of the limits and scope of the invention disclosed.

I claim:

1. A CD storage rack and lamp assembly comprising: a base, a base covering covered on said base, four sets of connecting rods respectively connected in series by connectors, a lamp stand connected to said base and said base covering by said connecting rods, a lamp holder, a plurality of telescopic arms connected between said lamp holder and said lamp stand, and a plurality of CD carrier plates fastened to said connecting rods at different elevations between said lamp stand and said base covering, wherein:

- each of the connecting rods having two outward annular flanges around the periphery near two opposite ends, a top coupling end at one of said opposite ends defining an inner thread, a bottom coupling end at the other of said opposite ends defining an inner thread;

- said lamp stand has a plurality of nut holders equiangularly spaced around the border, a plurality of through holes respectively defined within said nut holders, a plurality of nuts respectively mounted within said nut holder, a plurality of screws respectively threaded into said nuts and the inner threads of the top coupling ends of the respective connecting rods, and a plurality of ornamental caps respectively covered on said nut holders;

- each of the CD carrier plates has a plurality of mounting blocks corresponding to the through holes of said lamp stand, and a plurality of elongated CD loading slots for holding individual compact disks, said mounting block defining a respective mounting hole for mounting a respective one of said connectors, each CD loading slots comprising a spring member at one end and a stop plate at an opposite end for holding an individual compact disk in place;

- each of the connectors is comprised of a first half-round tube and a second half-round tube connected to define a tubular structure and then fitted into the mounting hole of one of the mounting blocks of a respective one of said CD carrier plates, said first half round tube having a plurality of pin holes, two inside mounting grooves near two opposite ends respectively engaged with the outward flanges of the respective connecting rods, and an outward flange stopped outside one of the mounting blocks of a respective one of said CD carrier plates, said second half-round tube having a plurality of pins respectively fitted into the pin holes of said first half-round tube, two inside mounting grooves near two opposite ends respectively engaged with the outward flanges of the respective connecting rods, and an outward flange stopped outside one of the mounting blocks of a respective one of said CD carrier plates;

- said base comprises a receiving chamber at the center for holding an electric circuit, and a plurality of mounting holes equiangularly spaced around said receiving chamber; and

- said base covering is covered on said base, having a plurality of mounting holes connected between the mounting holes of said base and the inner threads of the bottom coupling ends of the respective connecting rods by screws.

* * * * *